UNITED STATES PATENT OFFICE.

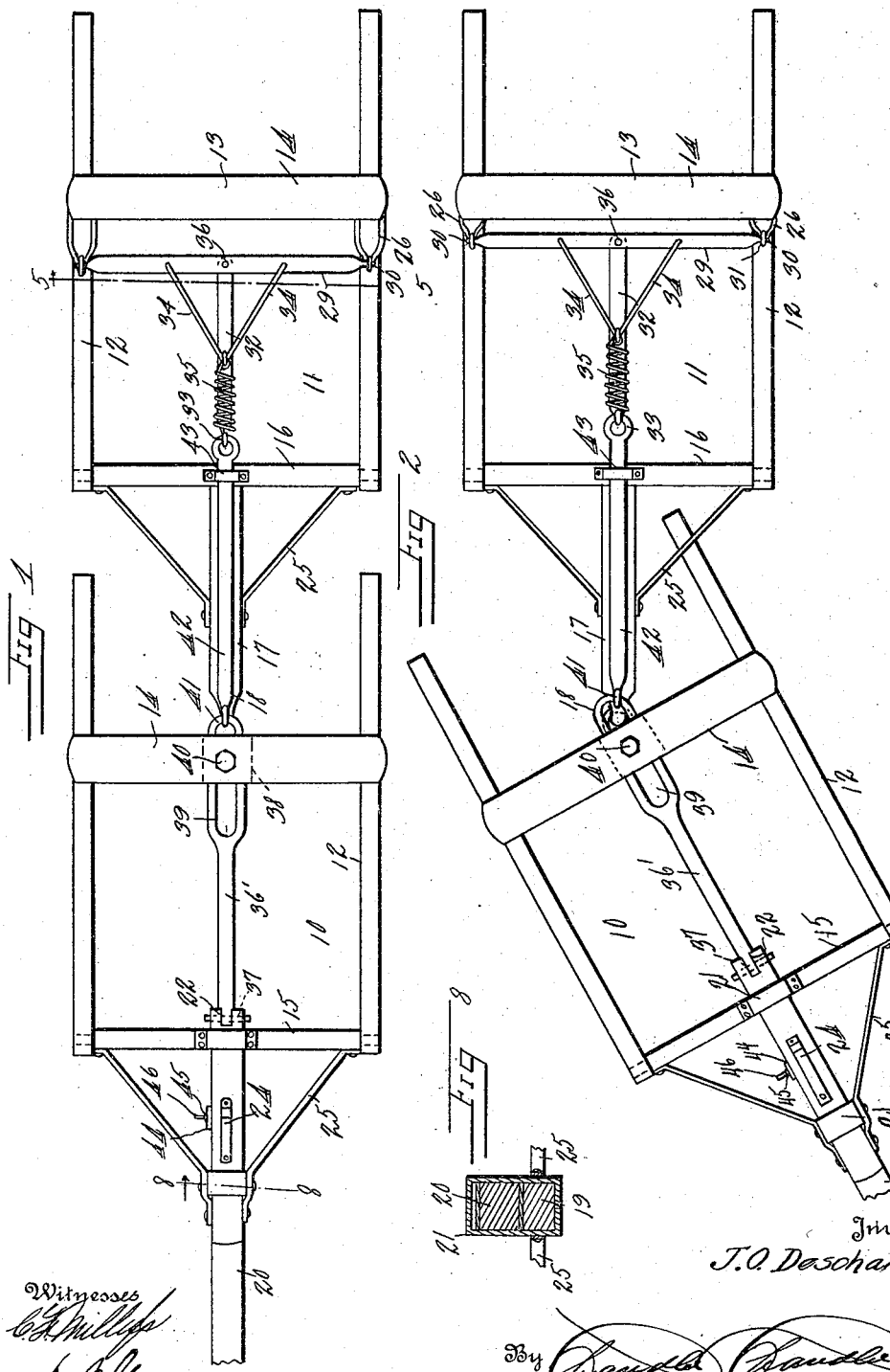

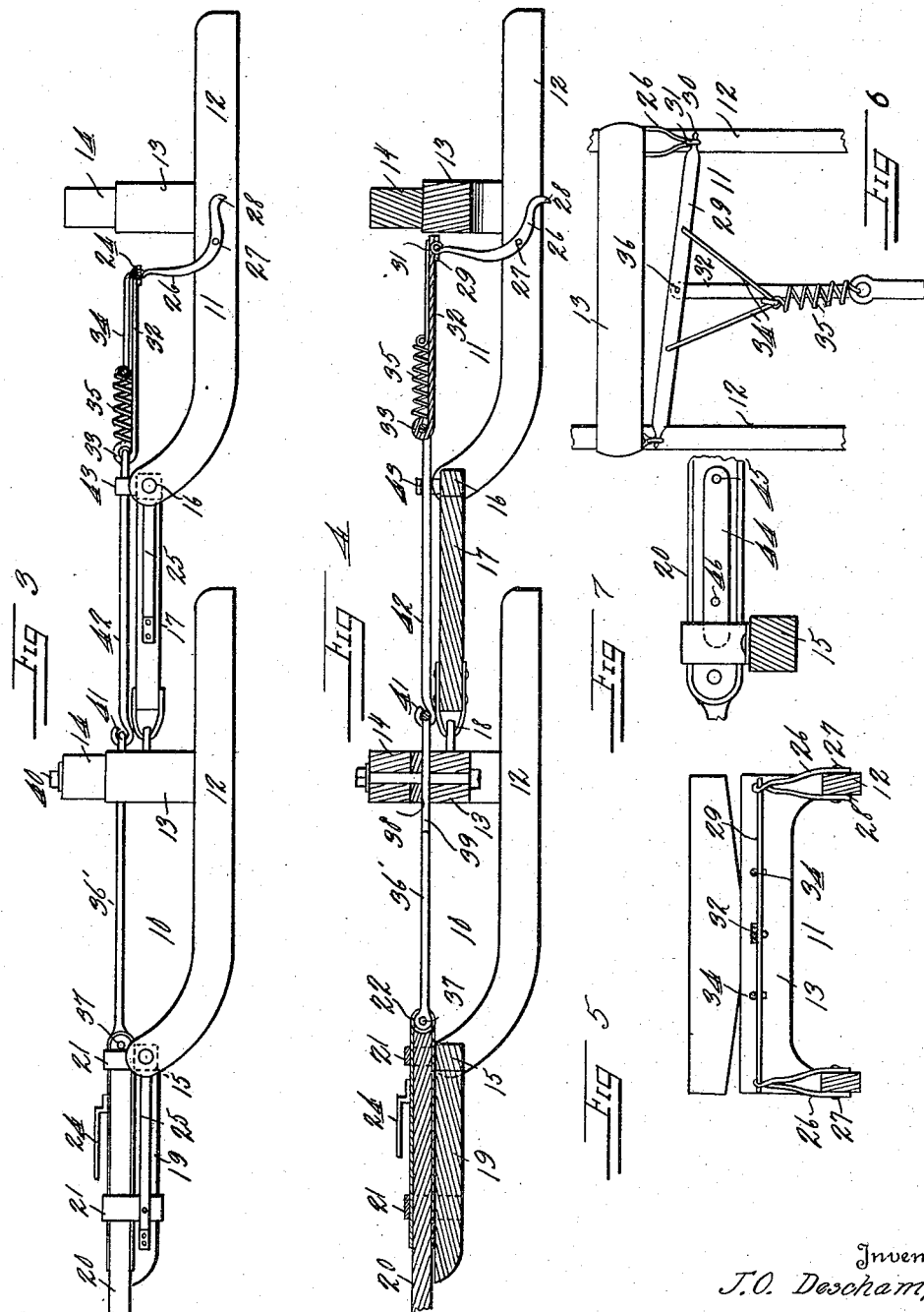

JOSEPH O. DESCHAMPS, OF LUMBY, BRITISH COLUMBIA, CANADA.

SLEIGH-BRAKE.

1,227,397.   Specification of Letters Patent.   Patented May 22, 1917.

Application filed June 29, 1916. Serial No. 106,720.

*To all whom it may concern:*

Be it known that I, JOSEPH O. DESCHAMPS, a subject of the King of Great Britain, residing at Lumby, in the Province of British Columbia, Dominion of Canada, have invented certain new and useful Improvements in Sleigh-Brakes; and I do hereby declare the following to be a full, clear, and exact description of the invention, such as will enable others skilled in the art to which it appertains to make and use the same.

This invention relates to brake mechanism, and particularly to sled brakes.

The primary object of the invention is to provide a simple and improved brake mechanism for sleds which acts or operates automatically upon retarding the draft pole or tongue to check the forward movement of the vehicle.

A further object of the invention is to provide a device of this character which is capable of application to a vehicle employing a plurality of trucks or sleds, the brake shoe or ground engaging element being arranged upon the rearmost sled, wherein turning of the guide or foremost sled or truck will in no way interfere with or render inoperative the connection between the brake shoe actuating mechanism upon the various trucks.

A still further object of the invention is to provide a brake mechanism of this character wherein the brake shoes or ground engaging elements yieldably contact the ground the construction permitting of the various shoes being moved away from the ground upon the same contacting with stones or other obstructions, and wherein one shoe may be thus moved without affecting the other.

A still further object of the invention is to provide a device of this construction which is of simple and inexpensive construction, which is composed of but few simple and readily assembled parts, all so arranged as to preclude breakage, derangement of wear of the same, and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings and particularly pointed out in the claims.

The invention will be best understood by reference to the accompanying drawings, wherein:

Figure 1 is a top plan view of a sleigh frame illustrating the application of a brake mechanism embodying my invention, Fig. 2 is a similar view showing the front sled of the frame slightly turned, Fig. 3 is a side elevation of the frame showing the brake in inoperative position, Fig. 4 is a longitudinal sectional view taken through the frame and illustrating the brakes applied, Fig. 5 is a sectional view taken on line 5—5 of Fig. 1, Fig. 6 is a fragmentary top plan view of the rear sled and showing the brake beam in moved position, Fig. 7 is a detail view of the improved draft pole locking device, and Fig. 8 is a sectional view taken on line 8—8 of Fig. 1.

Referring now more particularly to the drawings, 10 and 11 represent the forward and rear sleds respectively of the vehicle, the said sleds comprising the usual runners 12 connected by the bunk beams 13, the body supporting bolsters 14 being supported by the latter. The forward or guide sled 10 has the fore ends of its runners connected by the draft pole supporting bar 15, the latter being so connected to the runner ends as to oscillate therein. The forward end of the rear sled 11 is also connected by an oscillatory bar 16, from the intermediate portion of which is secured a forwardly extending reach pole 17. Coöperating loop members 18 are arranged upon the rear face of the bunk beam 13 of the forward sled and the forward end of the reach pole 17, whereby a positive connection between the two trucks or sleds is effected, and yet which permits turning of the forward sled.

Projecting forwardly from the bar 15 of the guide sled 10 is a pole supporting bar 19. A tongue or draft pole 20 rests upon the bar 19, and is held for sliding movement longitudinally of the said bar by straps or bands 21. The rearmost end of the draft pole 20 projects beyond the innermost of the guide straps and is bifurcated as at 22, the entire base portion of the draft tongue being preferably incased with a metallic sheet as shown. A draft clevis 24 is arranged upon the pole 20 to permit of the attachment of the usual double and swingle trees to the vehicle. Strut bars 25 connect the forward ends of the beam 19 with the outer extremities of the oscillatory bar 15 to effect a rigid connection between the said bars. Similar struts 25 are employed to effect a similar connection between the reach pole 17 and the connecting bar 16 of the rear sled.

The ground engaging elements or shoes are in the present instance formed of yoke members 26, the said yoke members being inverted and engaged over the runners 12 of the rear sled, and are pivoted to the said runners as at 27 inwardly from their free ends. The extremities of these members are hooked as at 28, and it is apparent from this construction that rearward rocking movement of the yokes 26 will cause the hooked portions 28 to rock downwardly into engagement with the ground. These ground engaging elements are arranged upon the runners 12 in parallel alinement and slightly in advance of the bunk beam 13, being connected at their uppermost ends of bight portions by a beam 29. The ends of this beam are reduced to provide pintles 30 to project through loops or apertures 31 formed at the bight portions of each of the ground engaging yokes. A brake bar 32 projects forwardly from the intermediate portion of the beam 29 and terminates at its free end in a loop or eye 33 in close proximity to the connecting bar 16 of the rear sled. Evener rods 34 are connected at one end to the brake beam 29 upon each side of the bar 32, and converge at their forward ends and are connected over the bar 32 intermediate the ends of the latter. A contractile spring 35 connects the meeting ends of the evener rods 34 with the loop portion 33 of the brake bar 32, and it is apparent that rocking movement of the brake beam 29 upon its pivot 36 on the brake bar 32 will be resisted by the spring 35. It is also apparent that rearward movement of the beam 29 forces the brake shoes 26 into engagement with the ground, while forward movement of the said beam withdraws the said shoes. Should one of the shoes when in ground engaging position contact with a stone or other rigid substance such as would be likely to injure the shoe, the latter will rock upon its pivot 27, the spring 35 permitting of the necessary oscillatory movement of the brake beam 29. The shoe upon the opposite runner is not effected by rearward movement of the first mentioned shoe, and immediately upon passing the obstruction the shoe will be forced into contact with the ice or snow by means of the spring 35.

A connecting bar 36' is pivoted at one end by the pin 37 within the bifurcated rear end of the slidable draft pole 20, and extends rearwardly therefrom through an opening 38 formed in the bunk beam 13 of the forward sled. The latter end of the connecting bar 36' is widened as shown and is provided with an elongated slot 39, through which the pivot pin 40 connecting the forward bolster 14 with the bunk beam 13 extends. The rearward extremity of the connecting bar 36' projects beyond the bunk beam and standard and the looped end 41 of a link 42 is connected thereto, the said link passing rearwardly over the reach pole 17 through guides 43 thereon, and is connected at its rearward extremity to the looped end 33 of the brake bar 32. The protruding ends of the pivot pin 37 limit the forward movement of the draft pole 20, the said ends engaging with the rearmost guide strap 21, and when in this position the ground engaging elements are raised or out of engagement with the ground. Upon rearward sliding movement being applied to the tongue 20, the connecting bar 36' will slide rearwardly, causing the link 42 to similarly move, whereby the rearward movement thus applied to the beam 29 will cause the brake shoe yokes 26 to rock rearwardly to force their extremities into braking engagement with the ground. Immediately upon the forward movement being applied to the draft tongue 20 the brake shoes will disengage from the ground. It is thus seen that backing of the draft animals will at once cause the brake shoes to be applied, and as the draft pole moves forwardly faster than the traveling gait of the draft animals, such as is caused on down grades, the resistance offered by the animals will cause the tongue to slide rearwardly and to apply the brakes.

Should it be desired to render the braking mechanism inoperative, a lock lever 44, pivoted at one end as at 45, to the side of the draft pole 20 may be swung upwardly and engaged between the said pole and its retaining strap 21, a pin 46 on the free end of said lever limiting the rearward movement of the said pole. It is thus seen that the tongue may be locked against sliding movement, and in such manner that the brake shoes are disengaged from the ground. It is apparent that from the particular manner of connecting the ends of the connecting bar 36', the link 42, and the brake bar 32, that the sled trucks may be moved freely with relation to each other without in any way affecting the ground engaging elements or deranging the various parts of the mechanism.

While I have herein shown and described a particular or preferred embodiment of the invention I wish it to be understood that I need not confine myself to all the precise details of construction herein set forth by way of illustration as modification and variation may be made without departing from the spirit of the invention or exceeding the scope of the claims.

What is claimed is:—

1. In a device of the class described, the combination with front and rear sleds, brake shoes, arranged on the rear sled and capable of movement into and out of engagement with the ground, a beam connecting said shoes, a brake bar pivoted to said beam, evener bars hingedly connecting the ends of said beam with said brake bar, a movable draft apparatus on said front sled, and a connection between said brake bar and said apparatus, substantially as described.

2. In a device of the class described, front and rear sleds, brake shoes arranged on the rear sled, and capable of movement toward and away from the ground, a brake beam attached to said shoes, a brake bar, a resilient connection between the beam and the bar, a movable draft apparatus, and a connection between said brake bar and said apparatus, substantially as described.

3. In a device of the class described, front and rear sleds, brake shoes pivoted to the runners of the rear sled and adapted to move into and out of engagement with the ground, a brake beam connecting said shoes, a brake bar, evener rods connected together at one end and to the opposite ends of said beam at their other extremities, a spring connecting said connected ends with said brake bar, a movable draft apparatus, and a connection between said brake bar and said apparatus, substantially as described.

4. In a device of the class described, front and rear sleds, yokes straddling the runners of the rear sled and pivoted thereto inwardly from their ends, a brake beam connecting the upper ends of said yokes, a brake bar pivoted to said beam intermediate the ends of the latter, evener rods connected together at one end and being pivoted at their opposite ends to said beam adjacent the opposite ends of the latter, a spring connecting said connected ends with said brake bar, a sliding draft tongue, and a connection between said brake bar and said tongue, substantially as described.

5. In a device of the class described, the combination with front and rear sleds, of brake yokes straddling the runners of said rear sled and pivoted thereto inwardly from their ends and adapted to move into and out of engagement with the ground, a brake beam connecting said shoes, a brake bar pivoted intermediate the ends of said beam and extending forwardly therefrom, evener bars connected at one end to the extremities of said beam, a resilient connection between the opposite ends of said rods and said brake bar, a slidable draft pole on said front sled, means for limiting the forward and rearward movement of said pole, a connecting bar hinged at one end to the rear of said pole, the opposite end of said bar being provided with a slot, the said end extending through the bunk beam of said front sled, a pin extending through said beam and slot, and a link hingedly connecting the rear end of said connecting bar and the forward end of said brake bar, substantially as described.

In testimony whereof, I affix my signature, in the presence of two witnesses.

JOSEPH O. DESCHAMPS.

Witnesses:
 PERCY J. NASH,
 FRANK E. CHRISTIAN.

Copies of this patent may be obtained for five cents each, by addressing the "Commissioner of Patents, Washington, D. C."